United States Patent [19]

Johnson

[11] Patent Number: 5,711,227
[45] Date of Patent: Jan. 27, 1998

[54] PORTABLE AND COLLAPSIBLE DOLLY AND TRACK

[76] Inventor: Jerome K. Johnson, 9886 Rimmele Dr., Beverly Hills, Calif. 90210

[21] Appl. No.: 585,514

[22] Filed: Jan. 16, 1996

[51] Int. Cl.⁶ ............................................. E01B 23/00
[52] U.S. Cl. ................... 104/126; 104/106; 105/157.1; 238/10 R; 238/151; 403/292; 285/31
[58] Field of Search ................... 104/106, 126, 104/138.1; 105/157.1, 463.1; 238/10 R, 151, 166, 175, 243, 244; 403/292, 293; 285/31

[56] References Cited

U.S. PATENT DOCUMENTS

| 2,312,273 | 2/1943 | Stochmal | 238/10 R |
|---|---|---|---|
| 2,448,084 | 8/1948 | Davis | 396/20 |
| 2,932,478 | 4/1960 | Krieger | 248/125.2 |
| 2,952,411 | 9/1960 | Hand | 238/10 R |
| 3,374,974 | 3/1968 | Furrer et al. | 104/126 |
| 3,422,565 | 1/1969 | Kentfield et al. | 403/292 |
| 3,598,355 | 8/1971 | English | 396/428 |
| 4,037,788 | 7/1977 | Riley | 403/292 |
| 4,241,988 | 12/1980 | Lepp | 396/4 |
| 4,699,484 | 10/1987 | Howell et al. | 352/423 |
| 4,712,264 | 12/1987 | Voith | 238/10 R |
| 4,768,442 | 9/1988 | Miller | 104/106 |
| 4,802,622 | 2/1989 | Homan | 238/10 R |
| 5,061,000 | 10/1991 | Haugen et al. | 403/297 |
| 5,105,741 | 4/1992 | Leary | 104/106 |

FOREIGN PATENT DOCUMENTS

| 2462232 | 8/1976 | Germany | 104/106 |
|---|---|---|---|

*Primary Examiner*—S. Joseph Morano
*Attorney, Agent, or Firm*—Thomas I. Rozsa; Tony D. Chen

[57] ABSTRACT

A portable and collapsible dolly and track system is movably supporting a tripod which retains a camera or the like thereon. Once the dolly and the track have been assembled, the dolly is positioned on top of the track. A tripod is positioned on the dolly, and thereby the dolly with the tripod will roll along the track in a horizontal plane with the camera thereon for filming a scene or taking photographs. The track comprises a pair of opposite longitudinal parallel rails arranged in a space apart relationship by three pivotable transverse bars. The pair of rails are comprised of a plurality of cylindrical tubes. The plurality of cylindrical tubes are held together with a unique BUNGEE cord type joining member in order to enable them to be very quickly and efficiently assembled and set into place and then disassembled for storage. The track can be folded for storage by withdrawing the ends of the plurality of cylindrical tubes from each other.

25 Claims, 5 Drawing Sheets

PORTABLE AND COLLAPSIBLE DOLLY AND TRACK

BACKGROUND OF THE INVENTION

1. Field of the Invention

The present invention generally relates to the field of camera accessories. More particularly, the present invention relates to a dolly and track system for movably supporting cameras and the like thereon.

2. Description of the Prior Art

In the motion picture industry or similar business, it has been the usual practice to provide off-site filming. Previously, many types of camera track systems have been developed to provide for the camera to roll freely thereon to film a scene. Stationary tracks have been employed to minimize the movement of the camera. These stationary tracks provide a level surface for the camera to operate on. However, these stationary tracks are very heavy and complicated to set up. In addition, when filming a scene that only requires a few minutes to shoot, the time consumed for setting up the track may not justify the cost. Also, the disadvantage with these track systems is that they are not collapsible or portable for someone to easily carry around at all times.

The following eight (8) prior art patents were uncovered in the pertinent field of the present invention:

1. U.S. Pat. No. 2,312,273 issued to Stochmal on Feb. 23, 1943 for "Stairs Track" (hereafter "the Stochmal Patent");

2. U.S. Pat. No. 2,448,084 issued to Davis on Aug. 31, 1948 for "Scanning Camera" (hereafter "the Davis Patent");

3. U.S. Pat. No. 2,932,478 issued to Krieger on Apr. 12, 1960 for "Adjustable Camera Dolly" (hereafter "the Krieger Patent");

4. U.S. Pat. No. 2,952,411 issued to Hand on Sep. 13, 1960 for "Mine Track Assembly" (hereafter "the Hand Patent");

5. U.S. Pat. No. 3,598,355 issued to English on Aug. 10, 1971 for "Camera Dolly" (hereafter "the English Patent");

6. U.S. Pat. No. 4,241,988 issued to Lepp on Dec. 30, 1980 for "Camera Support Bracket" (hereafter "the Lepp Patent");

7. U.S. Pat. No. 4,699,484 issued to Howell et al. on Oct. 13, 1987 for "Rail Mounted Camera System" (hereafter "the Howell Patent"); and 8. U.S. Pat. No. 4,802,622 issued to Homan on Feb. 7, 1989 for "Single Track Mobile Storage Structure And Method" (hereafter "the Homan Patent"). ( The Stochmal Patent discloses a track for stairs. It comprises two adjustable angle track members maintained in an adjustable spaced relationship by transverse rods. The two adjustable angle track members each comprises two telescopic sections which can be longitudinally adjusted. The transverse rods can be transversely adjusted to accommodate different stairs.

The Davis Patent discloses a scanning camera.

The Krieger Patent discloses an adjustable camera dolly. The adjustable camera dolly provides means for vertically raising and lowering the camera in a quick and efficient manner.

The Hand Patent discloses a mine track assembly. It comprises a rail structure which permits mechanized loading of mine vehicles along a curved path. The ends of each individual rail are angularly cut with the degree of angle being dependent upon the amount of curvature desired. The rails are connected by a hinge joint comprised of intermeshing lugs and secured by a hinge pin. The provision of edges effectively limits the amount of movement that the rails may take toward the origin of the radius of curvature.

The English Patent discloses a camera dolly. It comprises a frame which has a pair of spaced apart fixed parallel rails carried on adjustable height leg supports for rollably mounting a camera carriage. The carriage comprises a universal mount for releasably mounting a motion picture camera. Power means are provided for controllably moving the carriage on the rails via a drive train interconnecting the carriage on the rails. The camera dolly is adapted for employment for filming underwater scene sequences that are adapted to be viewed in a panoramic theater.

The Lepp Patent discloses a camera support bracket for supporting cameras and electronic flash units in an ideal arrangement for high quality photographic techniques.

The Howell Patent discloses a rail mounted camera system. It comprises a wheeled rail car with running gear connected to a chassis containing a movable panning head on the top and covered by an enclosure. The panning head has a motion picture camera mounted thereon and the rail car is self-propelled. The head rotatably tilts up and down and pans 360°. The car is movably installed on a track system which consists of mils interconnected together with ties. Each rail has a power strip supplying electrical energy to the car through a set of wipers. An electrical control system is positioned remotely from the tracks and provides control for propulsion and positioning the panning head as well as control of the camera.

The Homan Patent discloses a single track mobile storage structure and method. It comprises a single track with rail and guide portions for each row of separate storage units and structure for compensating for drift of the individual storage units which include adjusting screws for effecting leveling of the single track or varying the slope of the single track.

None of these prior art patents have disclosed a portable and collapsible dolly and track system for movably supporting a tripod which retains a motion picture camera or the like thereon. Therefore, it is highly desirable to have a very efficient, light weight and also very effective design and construction of a portable and collapsible dolly and track system for movably supporting a motion picture camera or the like thereon. It is desirable to provide a portable and collapsible dolly and track system with the capability of rapidly assembling and disassembling the dolly and track system in only a few minutes. It is also desirable to provide a system that is flexible enough to allow reassembling of the track in a much more efficient way than prior art tracks.

SUMMARY OF THE INVENTION

The present invention is a unique portable and collapsible dolly and track system for movably supporting a tripod which retains a camera or the like thereon. Once the dolly and the track have been assembled, the dolly is positioned on top of the track. A tripod will be positioned on the dolly, and thereby the dolly with the tripod will roll along the track in a horizontal plane with the camera thereon for filming a scene or taking photographs. The system provides a unique way to store the dolly and the track so that it can be easily portable and quickly assembled on site by a single person.

The track comprises a pair of opposite longitudinal parallel rails arranged in a spaced apart relationship by three pivotable transverse bars. The pair of rails are comprised of a plurality of cylindrical tubes. The plurality of cylindrical tubes are held together with a unique BUNGEE cord type joining member in order to enable them to be very quickly and efficiently assembled and set into place and then disassembled for storage. The track can be folded for storage by withdrawing the ends of the plurality of cylindrical tubes from each other.

When the dolly is assembled, it is generally a "T" shaped bar, and when disassembled the dolly has two space apart parallel bars. The tripod is positioned on top of the "T" shaped dolly, where the "T" shaped dolly can be movably rolled on the track with the tripod and camera thereon. The "T" shaped dolly has a plurality of holes thereon for securing bottom ends of the legs of the tripod.

It is therefore an object of the present invention to provide a dolly and track system, so that the system can be used with motion picture cameras or the like.

It is also an object of the present invention to provide a dolly and track system, where the dolly and the track are portable and collapsible for an individual to carry the system to off-site locations.

It is an additional object of the present invention to provide a dolly and track system, where the system can be assembled for use and disassembled for storage in a matter of minutes.

It is a further object of the present invention to provide a dolly and track system, where the track is comprised of a pair of parallel rails to provide a level surface for the camera to operate upon. These rails are separable into sections for installation on a flat surface, such as a sound stage or outside on the ground for off-site operations.

It is still a further object of the present invention to provide a dolly and track system, where the dolly comprises a plurality of wheels rollably supported on the pair of rails so that the dolly can be rolled on the rails in a horizontal plane. A tripod is positioned on top of the dolly and secured thereon, so that a motion picture camera or the like can be secured to the tripod for filming a scene.

In the preferred embodiment of the present invention, the system comprises a portable and collapsible dolly and track, wherein the dolly is generally "T" shaped. In an alternative embodiment of the present invention, the system comprises a portable and collapsible dolly and track, wherein the dolly is generally "H" shaped.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
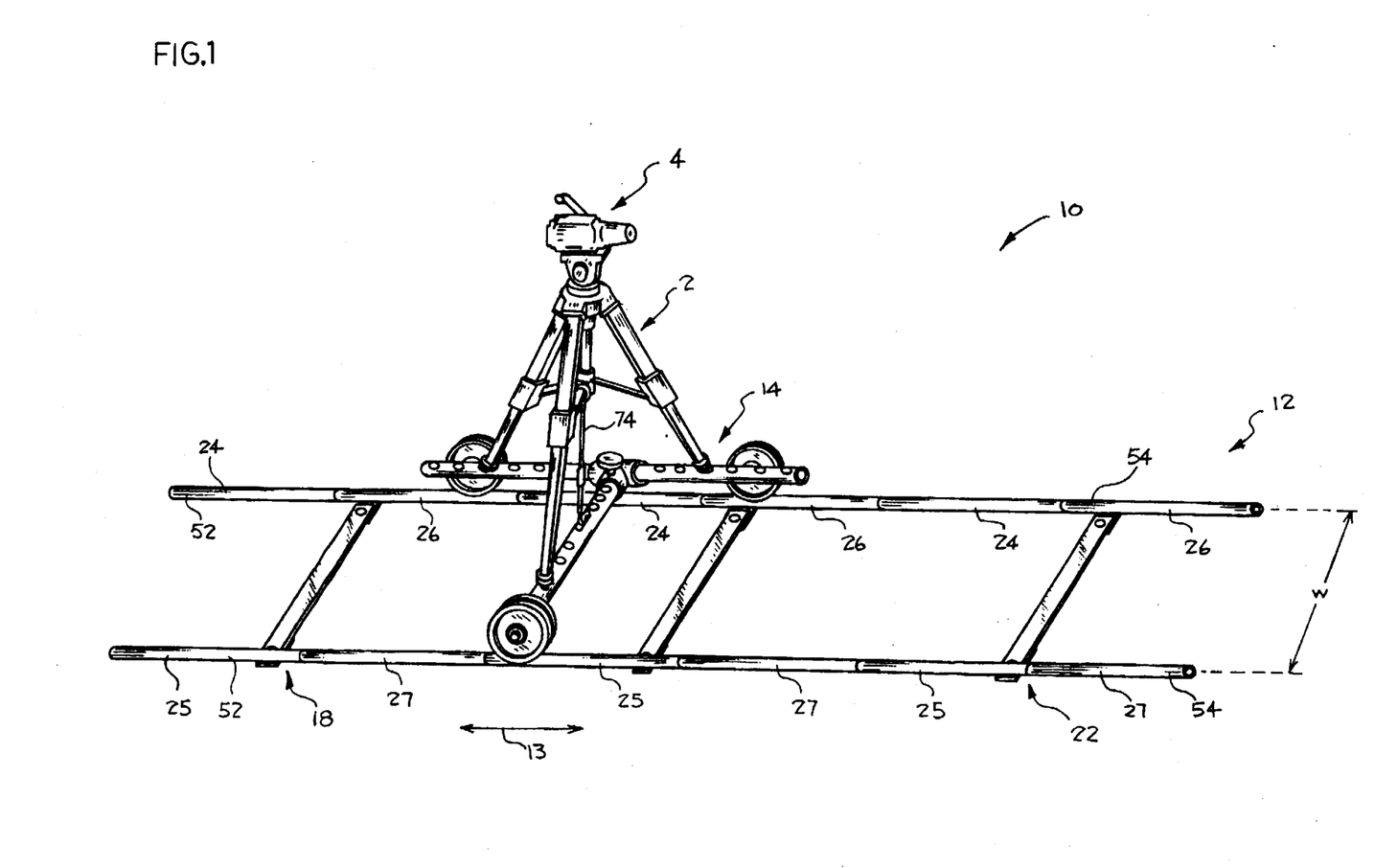
FIG. 1 is an illustration of a complete system of the preferred embodiment of the present invention.

Referring to FIG. 1, there is shown at 10 the best mode for carrying out the preferred embodiment of the present invention, which shows a complete system. This system 10 is comprised basically of a track assembly 12 and a dolly assembly 14. What is unique about the system 10 is that the track 12 and dolly 14 assemblies are portable and collapsible, and can be stored in a tote bag or other suitable means for an individual to carry the system around, and thereby when the system is required for filming a scene, the system can be assembled in a matter of minutes for shooting the scene.

The system 10 is used in combination with a conventional tripod 2 and a conventional motion picture or video camera or the like 4.

It is noted that the track assembly 12 shown in FIG. 1 is of rectangular configuration so that the camera 4 moves from one end to the opposite end in a rectilinear movement as indicated by the double arrow 13. The tripod 2 is detachably carried on the dolly assembly 14 for detachably mounting the camera 4 thereon.

Figure 2:
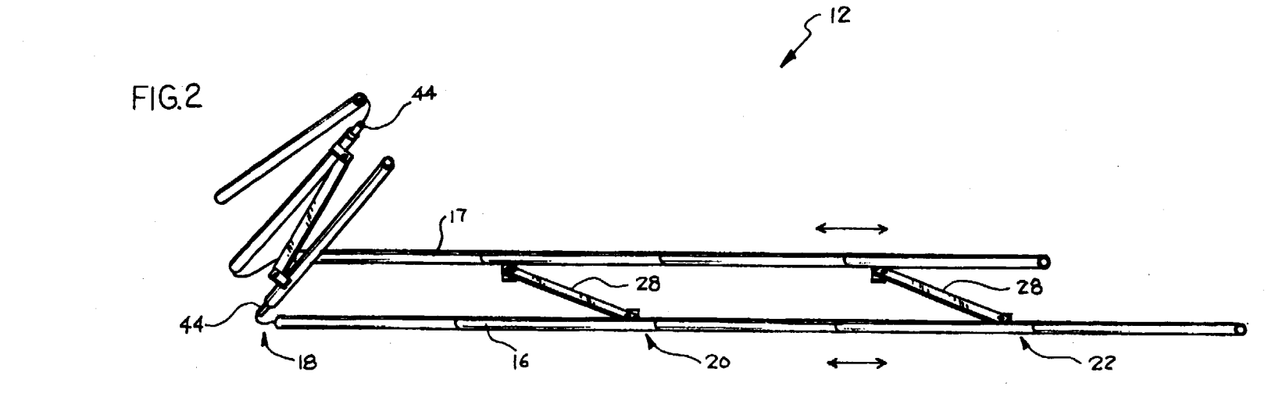
FIG. 2 is a perspective view of the track assembly of the present invention, showing the track assembly being collapsed and one of the sections being folded.

Referring to FIG. 2, there is shown at 12 a perspective view of the track assembly of the present invention system 10. The track assembly 12 is generally a pair of elongated longitudinal and parallel rails 16 and 17 arranged in a spaced-apart relationship. The track assembly 12 can further be broken down as having a left section 18, a middle section 20 and a right section 22 when viewed from left to right of this figure. In this figure, the track assembly 12 is being collapsed and the left section 18 is being folded.

Figure 3:
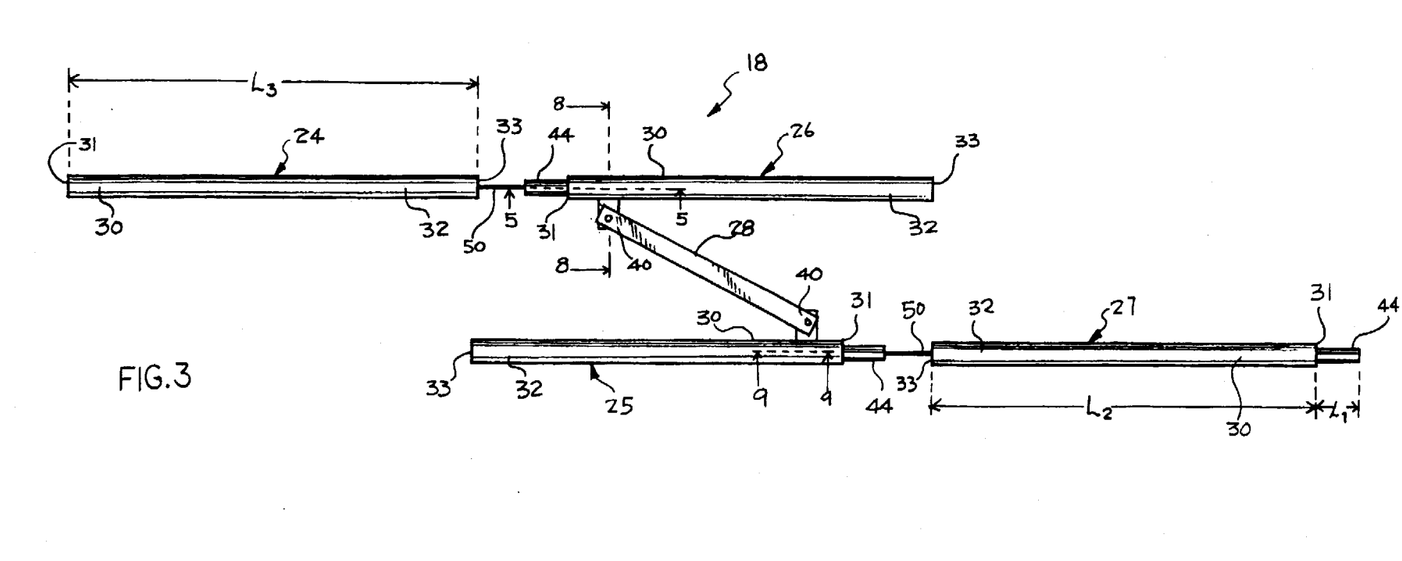
FIG. 3 is a top plan view of the left section of the track assembly being collapsed.
Figure 4:
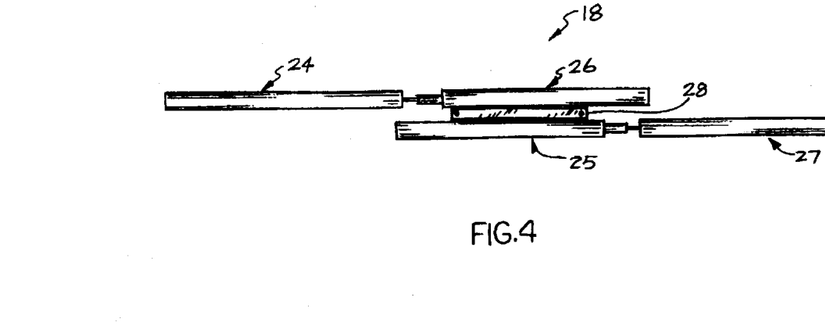
FIG. 4 is a top plan view of the left section of the track assembly in the folded condition.

Referring to FIG. 3, there is shown an enlarged top plan view of the left section 18 of the track assembly 12. Each section 18, 20 and 22 are substantially identical, and to the extent they are, only the left section 18 will be described in detail. The left section 18 comprises two pairs of longitudinal and parallel hollow cylindrical tubes 24, 25, 26 and 27, and a transverse brace 28. Each cylindrical tube has a proximal end portion 30 which terminates at a proximal end 31 and a distal end portion 32 which terminates at a distal end 33.

Figure 8:
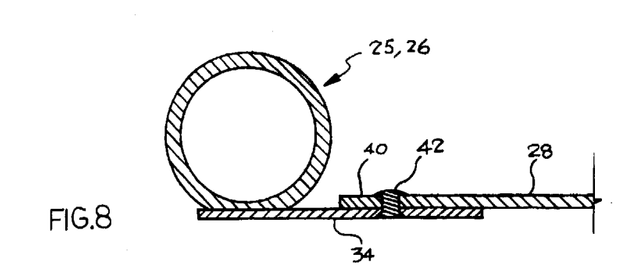
FIG. 8 is a partial enlarged cross-sectional view taken along line 8—8 of FIG. 3.
Figure 9:
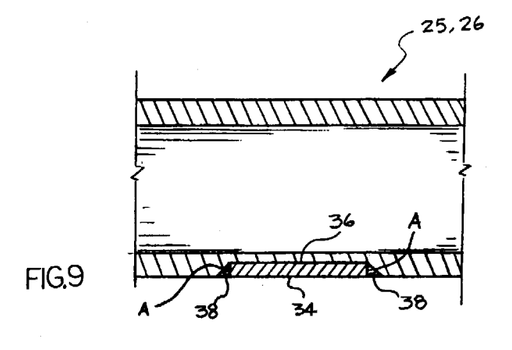
FIG. 9 is a partial enlarged cross-sectional view taken along line 9—9 of FIG. 3.

Referring to FIGS. 8 and 9, the cylindrical tubes 25 and 26 have a mounting tab 34 which is connected thereon by welding means. The cylindrical tubes 25 and 26 have a cut notch 36 that has a 45° angle "A" on both sides of the mounting tab 34 (see FIG. 9). The mounting tab 34 is welded within the cut notch 36 and filled on both sides of the angles "A" with welding material 38. The mounting tab 34 protrudes inwardly and is located adjacent to the proximal end 31 of the cylindrical tubes 25 and 26. Every other one of the cylindrical tubes has the mounting tab 34 (see FIG. 1). The length $L_2$ of the each cylindrical tube is approximately twenty-seven (27) inches.

Referring to FIGS. 3 and 8, opposite ends 40 of the transverse brace 28 are hingeably connected to the mounting tabs 34 of the cylindrical tubes 25 and 26 by a rivet 42 at opposite sides of the track assembly 12. The transverse brace 28 maintains the pair of parallel rails 16 and 17 together in the assembled condition. The transverse brace 28 swivels to collapse the pair of parallel rails 16 and 17 so that the track assembly 12 is in the folded condition.

Figure 5:
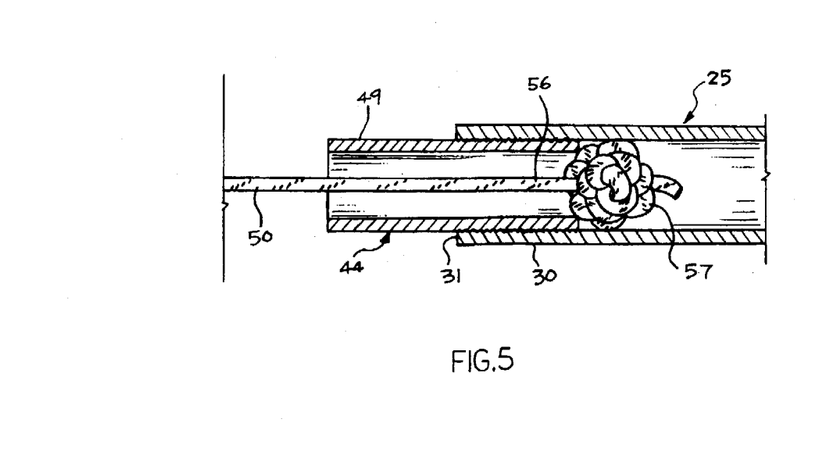
FIG. 5 is a partial enlarged cross-sectional view taken along line 5—5 of FIG. 3.
Figure 6:
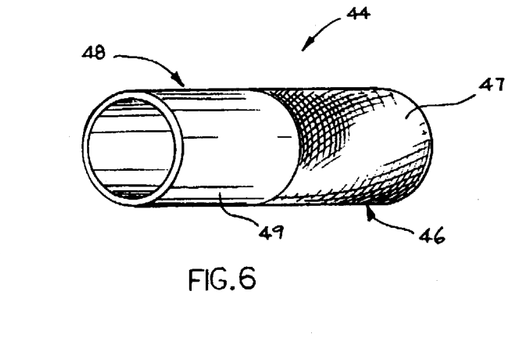
FIG. 6 is an enlarged perspective view of an inner connecting joint of the present invention.
Figure 7:
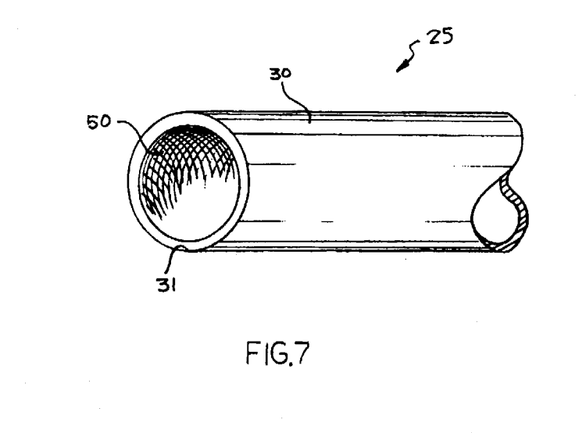
FIG. 7 is a partial enlarged perspective view of one of the connecting ends of one of the cylindrical tubes of the present invention.

Referring to FIG. 6, there is shown at 44 a perspective view of an inner connecting joint which has a proximal portion 46 with a knurled exterior surface 47 and a distal portion 48 with a smooth exterior surface 49. The total length of the inner connecting joint 44 is approximately six (6) inches, wherein the length $L_1$ is three (3) inches extending out from the cylindrical tube (see FIG. 3). Each of the cylindrical tubes also has a knurled interior surface 50 at its proximal end portion 30 (see FIG. 7). The knurled exterior surface 47 of inner connecting joint 44 is intermeshed with the interior knurled surface 50 of the proximal end portion 30 of each cylindrical tube (see FIG. 5) except for the cylindrical tubes 24 and 27 of the left and right sections 18 and 22 of the track assembly 12 which do not have the inner connecting joints 44 (see FIGS. 1 and 3). These tubes 24 and 27 of the left and right sections 18 and 22 are located at opposite ends and sides of each other (see FIG. 1) and are shorter than the other cylindrical tubes. The tubes 24 and 27 each have a length designated as $L_3$ which is approximately 22⅝ inches. The smooth interior surface 49 of the distal portion 48 of the inner connecting joint 44 is slidably placed coaxially within an adjacent one of the distal end portions 32 of each hollow cylindrical tube which also has a smooth interior surface for smooth engagement and easy disengagement or disassembly.

Referring again to FIGS. 1, 2 and 3, the middle section 20 of the track assembly 12 is identical in construction to the left section 18 of the track assembly 12 shown in FIG. 3 except that the cylindrical tube 24 of the middle section 20 further has the inner connecting joint 44 which is located at the proximal end 31. The right section 22 of the track assembly 12 is identical in construction to the left section 18 shown in FIG. 3 except that the cylindrical tube 27 does not have the inner connecting joint 44.

Referring to FIGS. 1, 3 and 5, there is shown an elongated BUNGEE cord 50 which extends from one end 52 to the other end 54 of each of the pair of parallel rails 16 and 17 for retaining the cylindrical tubes together. Each end 56 of the BUNGEE cord 50 is tied together to form a knot 57 for retaining the end 56 of the BUNGEE cord 50 thereto (see FIG. 5).

Figure 10:
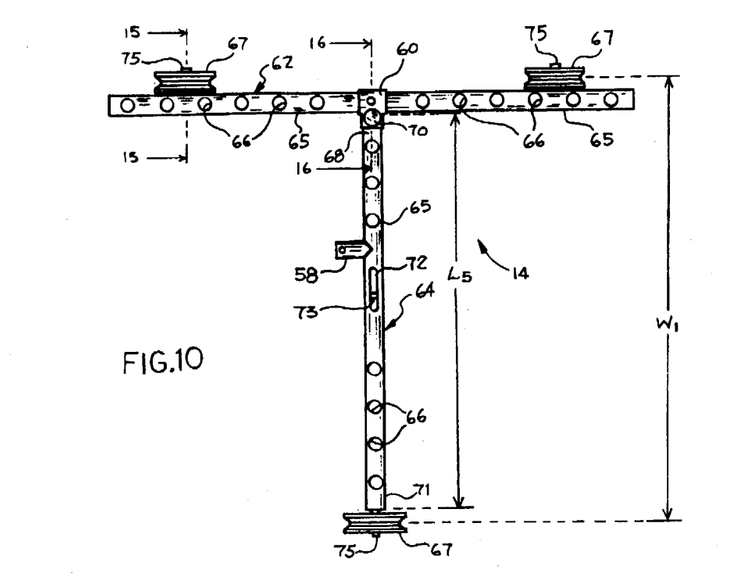
FIG. 10 is a top plan view of the preferred embodiment of a T-shaped dolly assembly of the present invention system, shown in the assembled condition.

Referring to FIGS. 1 and 10, there is shown at 14 the dolly assembly which is generally a T-shape structure. The dolly assembly 14 is used for movably supporting the tripod 2 which retains the motion picture camera 4 or the like thereon (see FIG. 1). The dolly assembly 14 is carried on the pair of parallel rails 16 and 17, and adapted to travel in a horizontal plane between opposite ends of the track assembly 12. The dolly assembly 14 comprises a T-shaped adapter 60, a longitudinal cylindrical bar 62, a transverse cylindrical bar 64, and three wheels 67. Each cylindrical bar has a circumferential sidewall 65 and a multiplicity of holes 66 facing upward. The length $L_4$ of the longitudinal cylindrical bar 62 is approximately 29 inches. The transverse cylindrical bar 64 has one end 68 which is removably connected to the T-shaped adapter 60 by a thumb screw 70 (see FIG. 16) and located perpendicular to the longitudinal cylindrical bar 62. The length $L_5$ of the transverse cylindrical bar when assembled is approximately 22 inches. A slot 72 is located approximately centrally on the transverse cylindrical bar 64 and a post 73 is located therein. A nylon cord ratchet system 74 is used for tying down the tripod 2 to the dolly assembly 14, where one end of the ratchet system 74 is hooked to the post 73 and the other end is hooked to the tripod 2 (see FIG. 1). The bottom ends of the legs of the tripod 2 are secured to the multiplicity of holes 66 on the cylindrical bars 62 and 64 respectively.

The dolly assembly 14 is further comprised of three wheels 67. Two of the wheels 67 are coaxially aligned together and connected to the circumferential sidewalls 65 of the longitudinal cylindrical bar 62 by axles 75. The third wheel 67 is connected to the other end 71 of the transverse cylindrical bar 64 by other axle 75. When the dolly assembly 14 is assembled, the width $W_1$ of the dolly is the same as the width W of the track, which is approximately 24½ inches.

Figure 15:
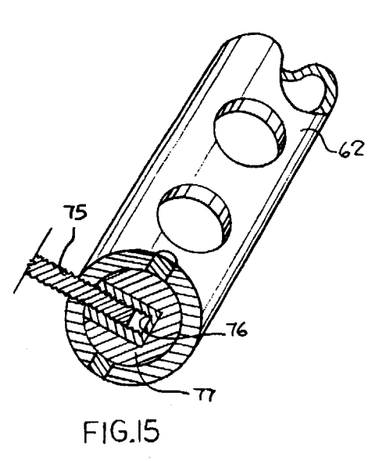
FIG. 15 is an enlarged perspective cut-away view taken along line 15—15 of FIG. 10.

Referring to FIG. 15, there is shown how the axle 75 is connected to the cylindrical bars 62 and 64. The axle 75 is threadedly engaged with a threaded opening 76 in a hub 77 and located within each of the cylindrical bars 62 and 64.

Figure 14:
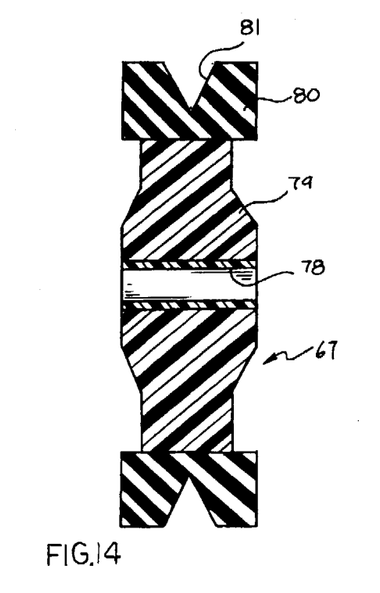
FIG. 14 is an enlarged cross-sectional view of one of the wheels of the dolly assembly of the present invention system.

Referring to FIG. 14, there is shown a cross-sectional view of the wheel 67. Each of the wheels 67 are substantially identical, and to the extent they are, only one will be described in detail. The wheel 67 has an inner structure 78 which is a self-lubricated bearing, a middle structure 79 which is a hard core connected to and surrounding the inner structure 78, and an outer structure 80 which is a soft rim connected to and surrounding the middle structure 79. The outer structure 80 has a longitudinal continuous 45° narrow groove 81 which is provided so that when the dolly assembly 14 moves, the wheels 67 roll on the track assembly 12, thereby aligning the track assembly 12 to form a rectangular shaped structure. By way of example only, the inner and middle structures 78 and 79 are made of hard plastic material while the outer structure 80 is made of soft synthetic rubber material.

Figure 11:
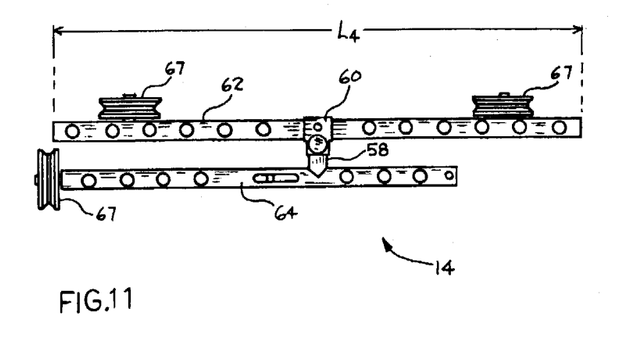
FIG. 11 is a top plan view of the T-shaped dolly assembly shown in FIG. 10, shown in the disassembled condition.
Figure 16:
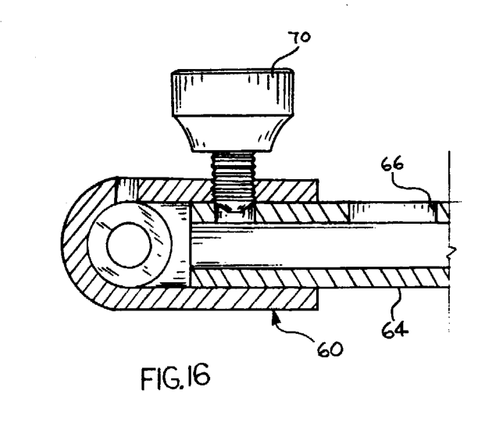
FIG. 16 is a partial enlarged cross-sectional view taken along line 16—16 of FIG. 10.

Referring to FIGS. 11 and 16, there is shown at 14 the T-shaped dolly assembly in its portable and collapsed condition. When the T-shaped dolly assembly 14 is not in use, it can be collapsed by loosening the thumb screw 70 and removing the end 68 of the transverse cylindrical bar 64 from the T-shaped adapter 60. The protruding connection 58 is positioned in the T-shaped adapter 60, and the thumb screw 70 is re-tightened to secure the protruding connection 58 thereto. What is unique about the dolly assembly 14 is that when it is collapsed and stored, the length of the collapsed assembly is approximately the same length as the longitudinal cylindrical bar 64 as shown in FIG. 11, wherein part of the wheel 74 is roughly aligned with one end of the longitudinal cylindrical bar 62.

The present invention conforms to conventional forms of manufacture or any other conventional way known to one skilled in the art. By way of example, the cylindrical tubes 24, 25, 26 and 27 may be made of aluminum material with an outside diameter approximately ½ inch and an inside diameter approximately ⅜ inch. By way of example, the cylindrical bars 62 and 64 may be made of aluminum material with an inside diameter approximately ¾ inch and an outside diameter approximately one (1) inch. By way of example, the T-shaped adapter 60 may be made of cast aluminum with an inside diameter approximately one (1) inch.

It will be appreciated that the dimensions described above are merely one illustrative embodiment and can include many other comparable sets of dimensions and angles.

Figure 12:
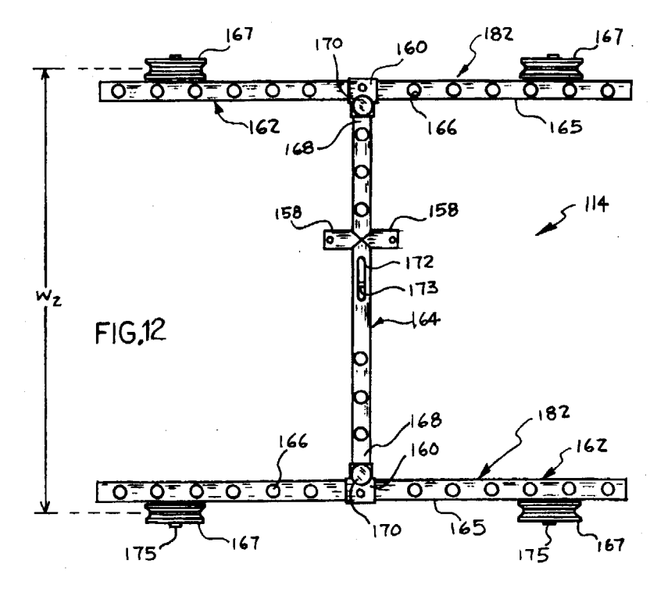
FIG. 12 is a top plan view of an alternative embodiment of an H-shaped dolly assembly of the present invention system, shown in the assembled condition.

Referring to FIG. 12, there is shown a top plan view of an alternative embodiment of a dolly assembly 114 of the present invention which is similar to that in the preceding embodiment just described and the only difference is the nature and configuration of the dolly assembly 114. All of the parts of the alternative embodiment dolly assembly 114 are numbered correspondingly with 100 added to each number.

In this embodiment, the dolly assembly 114 is generally H-shaped. The dolly assembly 114 comprises a pair of parallel legs 182 which are connected together by a transverse cylindrical bar 164. Each parallel leg 182 comprises a T-shaped adapter 160, a longitudinal cylindrical bar 162, and two wheels 167. Each of the cylindrical bars 162 and 164 has a circumferential sidewall 165 and a multiplicity of holes 166 facing upward. The transverse cylindrical bar 164 has opposite ends 168 which are removably connected to the T-shaped adapters 160 by thumb screws 170, and is positioned perpendicular to the pair of parallel legs 182. A slot 172 is located approximately centrally on the transverse cylindrical bar 164 and a post 173 is located therein. A nylon cord ratchet system is used for tying down the tripod to the dolly assembly 114, where one end of the ratchet system is hooked to the post 173 and the other end is hooked to the tripod (similar to FIG. 1). The bottom ends of the legs of the tripod are secured to the multiplicity of holes 166 on the cylindrical bars 162 and 164 respectively.

The pair of the wheels 167 are coaxially aligned together and connected to the circumferential sidewalls 165 of the two longitudinal cylindrical bars 162 by axles 175. When the dolly assembly 114 is assembled, the width $W_2$ of the dolly is the same as the width W of the track.

Figure 13:
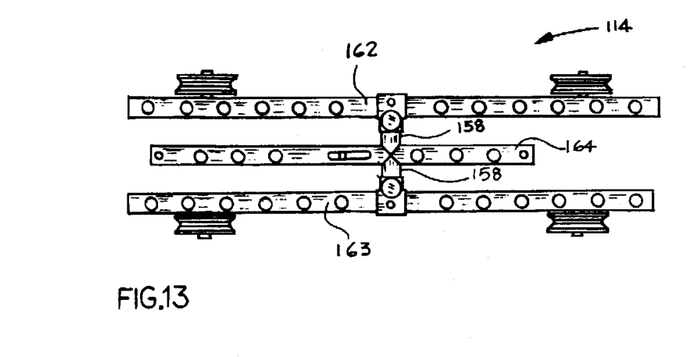
FIG. 13 is a top plan view of the H-shaped dolly assembly shown in FIG. 12, shown in the disassembled condition.

Referring to FIG. 13, there is shown the dolly assembly 114 in its portable and collapsed condition. When the H-shaped dolly assembly 114 is not in use, it can be collapsed by loosening the thumb screws 170 and removing the ends of the transverse cylindrical bar 164 from the T-shaped adapters 160. The protruding connections 158 are positioned in the T-shaped adapters 160, and the thumb screws 170 are re-tightened to secure the protruding connections 158 thereto.

Defined in detail, the present invention is a system for movably supporting a camera tripod, comprising: (a) a collapsible track assembly, including (i) a pair of elongated longitudinal and parallel rails arranged in a spaced-apart relationship; (ii) each one of said pair of rails including a hollow cylindrical end tube with a smooth exterior surface and a smooth interior surface, and a multiplicity of hollow cylindrical connection tubes each having a smooth exterior surface and a proximal end portion with a knurled interior surface and a distal end portion with a smooth interior surface; (iii) a multiplicity of connecting joints each having a proximal half portion with a smooth exterior surface and a distal half portion with a knurled exterior surface, each connecting joint attached to said proximal end portion of said each connection tube, where the knurled exterior surface of the distal half portion of the connecting joint intermeshes with said knurled interior surface of said proximal end portion of said each connection tube, and the proximal half portion is ready to be slidably inserted coaxially within said distal end portion of an adjacent one of said of hollow cylindrical tubes to thereby form said each rail; (iv) a multiplicity of mounting tabs mounted to selected ones of said hollow cylindrical tubes, each mounting tab transversely protruding inwardly and located adjacent to said proximal end portion of a respective one of the selected ones of said cylindrical tubes, where the mounting tabs on one of said pair of rails are aligned with the mounting tabs on the other one of said pair of rails; (v) a multiplicity of transverse braces, each transverse brace having opposite ends hingeably connected to two aligned ones of said mounting tabs mounted on said two parallel rails for interconnecting the selected ones of said hollow cylindrical tubes to form said parallel rails, whereas when said tubes are disassembled, said braces can be rotated into a parallel relationship with said tubes to collapse said pair of parallel rails in a folded condition; (vi) an elongated BUNGEE cord extending inside said each rail for retaining said hollow cylindrical tubes together; (b) a detachable dolly assembly movably carried on said pair of parallel rails, including: (i) a longitudinal hollow cylindrical bar having two opposite ends, and a transverse hollow cylindrical bar having a proximal end and a distal end; (ii) each cylindrical bar having a circumferential sidewall with a multiplicity of holes for selectively receiving the feet of said tripod; (iii) a T-shaped adapter mounted at a middle portion of said longitudinal bar; (iv) said proximal end of said transverse bar detachably connected to said T-shaped adapter, forming a T-shaped dolly; (iv) two wheels mounted at said opposite ends of said longitudinal bar respectively, and one wheel mounted at said distal end of said transverse bar, the three wheels freely rotatable and riding on said rails; and (v) said transverse bar having a protruding connection located on the circumferential sidewall, whereas when said transverse bar is detached from said T-shaped adaptor, the protruding connection can be attached thereon to place said transverse bar in a parallel relationship with said longitudinal bar when said dolly assembly is not in use; (c) whereby said track assembly and said dolly assembly can be assembled to movably support said tripod, or disassembled when not in use for easy storage or transportation.

Defined broadly, the present invention is a system for movably supporting a camera tripod, comprising: (a) a collapsible track assembly, including a pair of elongated longitudinal and parallel rails arranged in a spaced-apart relationship; (b) each one of said pair of rails including a hollow cylindrical end tube with a smooth exterior surface and a smooth interior surface, and a multiplicity of hollow cylindrical connection tubes each having a smooth exterior surface and a proximal end portion with a knurled interior surface and a distal end portion with a smooth interior surface; (c) a multiplicity of connecting joints each having a proximal half portion with a smooth exterior surface and a distal half portion with a knurled exterior surface, each connecting joint attached to said proximal end portion of said each connection tube, where the knurled exterior surface of the distal half portion of the connecting joint intermeshes with said knurled interior surface of said proximal end portion of said each connection tube, and the proximal half portion is ready to be slidably inserted coaxially within said distal end portion of an adjacent one of said of hollow cylindrical tubes to thereby form said each rail; (d) a multiplicity of mounting tabs mounted to selected ones of said hollow cylindrical tubes, each mounting tab transversely protruding inwardly and located adjacent to said proximal end portion of a respective one of the selected ones of said cylindrical tubes, where the mounting tabs on one of said pair of rails are aligned with the mounting tabs on the other one of said pair of rails; (e) a multiplicity of transverse braces, each transverse brace having opposite ends hingeably connected to two aligned ones of said mounting tabs mounted on said two parallel rails for interconnecting the selected ones of said hollow cylindrical tubes to form said parallel rails, whereas when said tubes are disassembled, said braces can be rotated into a parallel relationship with said tubes to collapse said pair of parallel rails in a folded condition; (f) an elongated BUNGEE cord extending inside said each rail for retaining said hollow cylindrical tubes together; and (g) a dolly assembly movably carried on said pair of parallel rails; (h) whereby said track assembly can be assembled to movably carry said dolly assembly for supporting said tripod, or disassembled when not in use for easy storage or transportation.

Defined more broadly, the present invention is a system for movably carrying a dolly assembly which supports a camera tripod, comprising: (a) a collapsible track assembly, including a pair of elongated longitudinal and parallel rails arranged in a spaced-apart relationship; (b) each one of said pair of rails including a multiplicity of hollow cylindrical tubes each having a smooth exterior surface; (c) means for collapsibly interconnecting said hollow cylindrical tubes to form said parallel rails; (d) means for collapsible interconnecting said two parallel rails in a parallel relationship; and (e) means for retaining said hollow cylindrical tubes together; (f) whereby said track assembly can be assembled to movably carry said dolly assembly for supporting said tripod, or disassembled when not in use for easy storage or transportation.

Defined alternatively, the present invention is a dolly assembly for movably supporting a camera tripod, comprising: (a) a longitudinal hollow cylindrical bar and a transverse hollow cylindrical bar; (b) each cylindrical bar having a multiplicity of holes for selectively receiving the feet of said tripod; (c) two wheels carried at opposite ends of said longitudinal bar; (d) a T-shaped adapter mounted on said longitudinal bar; (e) said transverse bar detachably connected to said T-shaped adapter at one end and carrying a wheel at an other end, forming a T-shaped dolly; and (f) said transverse bar having a protruding connection located on the circumferential sidewall, whereas when said proximal end of said transverse bar is detached from said T-shaped adaptor, the protruding connection can be attached thereon to place said transverse bar in a parallel relationship with said longitudinal bar when said dolly assembly is not in use; (g) whereby said dolly assembly can be assembled to movably riding on said rails for supporting said tripod, or disassembled when not in use for easy storage or transportation.

Also defined alternatively, the present invention is a dolly assembly for movably supporting a camera tripod, comprising: (a) two longitudinal hollow cylindrical bars and one transverse hollow cylindrical bar; (b) each cylindrical bar having a multiplicity of holes for selectively receiving the feet of said tripod; (c) two wheels carried at opposite ends of each said longitudinal bar; (d) a T-shaped adapter mounted at a middle portion of each said longitudinal bar; (e) said opposite ends of said transverse bar detachably connected to said T-shaped adapters, forming an H-shaped dolly; and (f) said transverse bar having two opposite protruding connections located on the circumferential sidewall, whereas when said opposite ends of said transverse bar are detached from said T-shaped adapters, the protruding connections can be attached thereon to place said transverse bar in a parallel relationship with said two longitudinal bars when said dolly assembly is not in use; (g) whereby said dolly assembly can be assembled to movably riding on said rails for supporting said tripod, or disassembled when not in use for easy storage or transportation.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A system for movably supporting a camera tripod, comprising:
   a. a collapsible track assembly, including
      (i) a pair of elongated longitudinal and parallel rails arranged in a spaced-apart relationship;
      (ii) each one of said pair of rails including a hollow cylindrical end tube with a smooth exterior surface and a smooth interior surface, and a multiplicity of hollow cylindrical connection tubes each having a smooth exterior surface and a proximal end portion with a knurled interior surface and a distal end portion with a smooth interior surface;
      (iii) a multiplicity of connecting joints each having a proximal half portion with a smooth exterior surface and a distal half portion with a knurled exterior surface, each connecting joint attached to said proximal end portion of said each connection tube, where the knurled exterior surface of the distal half portion of the connecting joint intermeshes with said knurled interior surface of said proximal end portion of said each connection tube, and the proximal half portion is ready to be slidably inserted coaxially within said distal end portion of an adjacent one of said of hollow cylindrical tubes to thereby form said each rail;
      (iv) a multiplicity of mounting tabs mounted to selected ones of said hollow cylindrical tubes, each mounting tab transversely protruding inwardly and located adjacent to said proximal end portion of a respective one of the selected ones of said cylindrical tubes, where the mounting tabs on one of said pair of rails are aligned with the mounting tabs on the other one of said pair of rails;

(v) a multiplicity of transverse braces, each transverse brace having opposite ends hingeably connected to two aligned ones of said mounting tabs mounted on said two parallel rails for interconnecting the selected ones of said hollow cylindrical tubes to form said parallel rails, whereas when said tubes are disassembled, said braces can be rotated into a parallel relationship with said tubes to collapse said pair of parallel rails in a folded condition;

(vi) an elongated elastic cord extending inside said each rail for retaining said hollow cylindrical tubes together;

b. a detachable dolly assembly movably carried on said pair of parallel rails, including:

(i) a longitudinal hollow cylindrical bar having two opposite ends, and a transverse hollow cylindrical bar having a proximal end and a distal end;

(ii) each cylindrical bar having a circumferential sidewall with a multiplicity of holes for selectively receiving the feet of said tripod;

(iii) a T-shaped adapter mounted at a middle portion of said longitudinal bar;

(iv) said proximal end of said transverse bar detachably connected to said T-shaped adapter, forming a T-shaped dolly;

(iv) two wheels mounted at said opposite ends of said longitudinal bar respectively, and one wheel mounted at said distal end of said transverse bar, the three wheels freely rotatable and riding on said rails; and (v) said transverse bar having a protruding connection located on the circumferential sidewall, whereas when said proximal end of said transverse bar is detached from said T-shaped adaptor, the protruding connection can be attached thereon to place said transverse bar in a parallel relationship with said longitudinal bar when said dolly assembly is not in use;

c. whereby said track assembly and said dolly assembly can be assembled to movably support said tripod, or disassembled when not in use for easy storage or transportation.

2. The system in accordance with claim 1 wherein said hollow cylindrical tubes and bars are made of aluminum.

3. The system in accordance with claim 1 wherein said wheels each has a self-lubricated bearing and a hard core made of plastic material and a soft rim made of soft rubber material.

4. A system for movably supporting a camera tripod, comprising:

a. a collapsible track assembly, including a pair of elongated longitudinal and parallel rails arranged in a spaced-apart relationship;

b. each one of said pair of rails including a hollow cylindrical end tube with a smooth exterior surface and a smooth interior surface, and a multiplicity of hollow cylindrical connection tubes each having a smooth exterior surface and a proximal end portion with a knurled interior surface and a distal end portion with a smooth interior surface;

c. a multiplicity of connecting joints each having a proximal half portion with a smooth exterior surface and a distal half portion with a knurled exterior surface, each connecting joint attached to said proximal end portion of said each connection tube, where the hurled exterior surface of the distal half portion of the connecting joint intermeshes with said knurled interior surface of said proximal end portion of said each connection tube, and the proximal half portion is ready to be slidably inserted coaxially within said distal end portion of an adjacent one of said of hollow cylindrical tubes to thereby form said each rail;

d. a multiplicity of mounting tabs mounted to selected ones of said hollow cylindrical tubes, each mounting tab transversely protruding inwardly and located adjacent to said proximal end portion of a respective one of the selected ones of said cylindrical tubes, where the mounting tabs on one of said pair of rails are aligned with the mounting tabs on the other one of said pair of rails;

e. a multiplicity of transverse braces, each transverse brace having opposite ends hingeably connected to two aligned ones of said mounting tabs mounted on said two parallel rails for interconnecting the selected ones of said hollow cylindrical tubes to form said parallel rails, whereas when said tubes are disassembled, said braces can be rotated into a parallel relationship with said tubes to collapse said pair of parallel rails in a folded condition;

f. an elongated elastic cord extending inside said each rail for retaining said hollow cylindrical tubes together; and g. a dolly assembly movably carried on said pair of parallel rails;

h. whereby said track assembly can be assembled to movably carry said dolly assembly for supporting said tripod, or disassembled when not in use for easy storage or transportation.

5. The system in accordance with claim 4 wherein said hollow cylindrical tubes are made of aluminum.

6. The system in accordance with claim 4 wherein said dolly assembly includes:

a. a longitudinal hollow cylindrical bar having two opposite ends, and a transverse hollow cylindrical bar having a proximal end and a distal end;

b. each cylindrical bar having a circumferential sidewall with a multiplicity of holes for selectively receiving the feet of said tripod;

c. a T-shaped adapter mounted at a middle portion of said longitudinal bar;

d. said proximal end of said transverse bar detachably connected to said T-shaped adapter, forming a T-shaped dolly;

e. two wheels mounted at said opposite ends of said longitudinal bar respectively, and one wheel mounted at said distal end of said transverse bar, the three wheels freely rotatable and riding on said rails; and f. said transverse bar having a protruding connection located on the circumferential sidewall, whereas when said proximal end of said transverse bar is detached from said T-shaped adaptor, the protruding connection can be attached thereon to place said transverse bar in a parallel relationship with said longitudinal bar when said dolly assembly is not in use;

g. whereby said dolly assembly can be assembled to movably ride on said rails for supporting said tripod, or disassembled when not in use for easy storage or transportation.

7. The system in accordance with claim 6 wherein said hollow cylindrical bars are made of aluminum.

8. The system in accordance with claim 6 wherein said wheels each has a self-lubricated bearing and a hard core made of plastic material and a soft rim made of soft rubber material.

9. The system in accordance with claim 4 wherein said dolly assembly includes:
   a. two longitudinal hollow cylindrical bars and one transverse hollow cylindrical bar each having a proximal end and a distal end;
   b. each cylindrical bar having a circumferential sidewall with a multiplicity of holes for selectively receiving the feet of said tripod;
   c. a T-shaped adapter mounted at a middle portion of each said longitudinal bar;
   d. said opposite ends of said transverse bar detachably connected to said T-shaped adapters, forming an H-shaped dolly;
   e. two wheels mounted at said opposite ends of each said longitudinal bar respectively, the four wheels freely rotatable and riding on said rails; and
   f. said transverse bar having two opposite protruding connections located on the circumferential sidewall, whereas when said opposite ends of said transverse bar are detached from said T-shaped adapters, the protruding connections can be attached thereon to place said transverse bar in a parallel relationship with said two longitudinal bars when said dolly assembly is not in use;
   g. whereby said dolly assembly can be assembled to movably ride on said rails for supporting said tripod, or disassembled when not in use for easy storage or transportation.

10. The system in accordance with claim 9 wherein said hollow cylindrical bars are made of aluminum.

11. The system in accordance with claim 9 wherein said wheels each has a self-lubricated bearing and a hard core made of plastic material and a soft rim made of soft rubber material.

12. A system for movably carrying a dolly assembly which supports a camera tripod, comprising:
   a. a collapsible track assembly, including a pair of elongated longitudinal and parallel rails arranged in a spaced-apart relationship;
   b. each one of said pair of rails including a multiplicity of hollow cylindrical tubes each having a smooth exterior surface;
   c. means for collapsibly interconnecting said hollow cylindrical tubes to form said parallel rails;
   d. means for collapsibly interconnecting said two parallel rails in a parallel relationship; and
   e. means for retaining said hollow cylindrical tubes together, wherein said means for retaining said hollow cylindrical tubes comprises an elastic cord extending inside said each rail;
   f. whereby said track assembly can be assembled to movably carry said dolly assembly for supporting said tripod, or disassembled when not in use for easy storage or transportation.

13. The system in accordance with claim 12 wherein said hollow cylindrical tubes are made of aluminum.

14. The system in accordance with claim 12 wherein said means for collapsibly interconnecting said hollow cylindrical tubes to form said parallel rails includes:
   a. a proximal end portion at each said hollow cylindrical tube with a knurled interior surface;
   b. a distal end portion at each said hollow cylindrical tube with a smooth interior surface;
   c. a multiplicity of connecting joints each having a proximal half portion with a smooth exterior surface and a distal half portion with a knurled exterior surface; and
   d. each connecting joint attached to said proximal end portion of said each hollow cylindrical tube, where the knurled exterior surface of the distal half portion of the connecting joint intermeshes with said knurled interior surface of said proximal end portion of said each connection tube, and the proximal half portion is ready to be slidably inserted coaxially within said distal end portion of an adjacent one of said of hollow cylindrical tubes to thereby form said each rail.

15. The system in accordance with claim 12 wherein said means for collapsibly interconnecting said two parallel rails in a parallel relationship includes:
   a. a multiplicity of mounting tabs mounted to selected ones of said hollow cylindrical tubes;
   b. each mounting tab transversely protruding inwardly and located adjacent to said proximal end portion of a respective one of the selected ones of said cylindrical tubes, where the mounting tabs on one of said pair of rails are aligned with the mounting tabs on the other one of said pair of rails; and
   c. a multiplicity of transverse braces, each transverse brace having opposite ends hingeably connected to two aligned ones of said mounting tabs mounted on said two parallel rails for interconnecting the selected ones of said hollow cylindrical tubes to form said parallel rails;
   d. whereas when said tubes are disassembled, said braces can be rotated into a parallel relationship with said tubes to collapse said pair of parallel rails in a folded condition.

16. A dolly assembly for movably supporting a camera tripod, comprising:
   a. a longitudinal hollow cylindrical bar and a transverse hollow cylindrical bar;
   b. each cylindrical bar having a multiplicity of holes for selectively receiving the feet of said tripod;
   c. two wheels carded at opposite ends of said longitudinal bar;
   d. a T-shaped adapter mounted on said longitudinal bar;
   e. said transverse bar detachably connected to said T-shaped adapter at one end and carrying a wheel at an other end, forming a T-shaped dolly; and
   f. said transverse bar having a protruding connection located on the circumferential sidewall, whereas when said proximal end of said transverse bar is detached from said T-shaped adaptor, the protruding connection can be attached thereon to place said transverse bar in a parallel relationship with said longitudinal bar when said dolly assembly is not in use;
   g. whereby said dolly assembly can be assembled to movably ride on said rails for supporting said tripod, or disassembled when not in use for easy storage or transportation.

17. The assembly in accordance with claim 16 wherein said hollow cylindrical bars are made of aluminum.

18. The assembly in accordance with claim 16 wherein said wheels each has a self-lubricated bearing and a hard core made of plastic material and a soft rim made of soft rubber material.

19. A dolly assembly for movably supporting a camera tripod, comprising:
   a. two longitudinal hollow cylindrical bars and one transverse hollow cylindrical bar;
   b. each cylindrical bar having a multiplicity of holes for selectively receiving the feet of said tripod;

c. two wheels carried at opposite ends of each said longitudinal bar;

d. a T-shaped adapter mounted at a middle portion of each said longitudinal bar;

e. said opposite ends of said transverse bar detachably connected to said T-shaped adapters, forming an H-shaped dolly; and f. said transverse bar having two opposite protruding connections located on the circumferential sidewall, whereas when said opposite ends of said transverse bar are detached from said T-shaped adapters, the protruding connections can be attached thereon to place said transverse bar in a parallel relationship with said two longitudinal bars when said dolly assembly is not in use;

g. whereby said dolly assembly can be assembled to movably ride on said rails for supporting said tripod, or disassembled when not in use for easy storage or transportation.

20. The assembly in accordance with claim 19 wherein said hollow cylindrical bars are made of aluminum.

21. The assembly in accordance with claim 19 wherein said wheels each has a self-lubricated bearing and a hard core made of plastic material and a soft rim made of soft rubber material.

22. A dolly assembly for movably supporting a camera tripod, comprising:

a. a longitudinal bar and a transverse bar, each bar having means for receiving a foot of said tripod;

b. two wheels carried at opposite ends of said longitudinal bar;

c. a T-shaped adapter mounted on said longitudinal bar; and d. said transverse bar detachably connected to said T-shaped adapter at one end and carrying a wheel at the other end, forming a T-shaped dolly;

e. whereby said dolly assembly can be assembled to movably ride on said rails for supporting said tripod.

23. The assembly in accordance with claim 22 wherein said transverse bar further comprises a protruding connection located on a sidewall, whereas when said proximal end of said transverse bar is detached from said T-shaped adaptor, the protruding connection can be attached thereon to place said transverse bar in a parallel relationship with said longitudinal bar when said dolly assembly is not in use.

24. The assembly in accordance with claim 22 wherein said longitudinal and transverse bars are made of aluminum.

25. The assembly in accordance with claim 22 wherein said wheels each has a self-lubricated bearing and a hard core made of plastic material and a soft rim made of soft rubber material.

* * * * *